US005724143A

United States Patent [19]

Huber et al.

[11] Patent Number: 5,724,143

[45] Date of Patent: Mar. 3, 1998

[54] METHOD AND DEVICE FOR DETERMINING THE AREA COVERAGE OF AN ORIGINAL

[75] Inventors: Werner Huber, Rauenberg; Helmut Kipphan, Schwetzingen, both of Germany

[73] Assignee: Heidelberger Druckmaschinen AG, Heidelberg, Germany

[21] Appl. No.: 857,332

[22] Filed: Mar. 25, 1992

[30] Foreign Application Priority Data

Mar. 25, 1991 [DE] Germany .......................... 41 09 744.0

[51] Int. Cl.$^{6}$ .................................................. G01B 11/28

[52] U.S. Cl. .......................... 356/380; 356/406; 356/419

[58] Field of Search .................................... 356/406, 407, 356/405, 416, 419, 425, 444, 445, 446, 379, 380

[56] References Cited

U.S. PATENT DOCUMENTS

| | | | |
|---|---|---|---|
| 4,444,505 | 4/1984 | Imamoto et al. | 356/380 |
| 4,512,662 | 4/1985 | Tobias | 356/380 |
| 4,564,290 | 1/1986 | Bell et al. | 356/380 |
| 4,681,455 | 7/1987 | Jeschke et al. | 356/380 |
| 5,141,323 | 8/1992 | Kipphan et al. | 356/419 |

FOREIGN PATENT DOCUMENTS

| | | |
|---|---|---|
| 3640956 | 8/1987 | Germany . |
| 2-164538 | 6/1990 | Japan . |

*Primary Examiner*—F. L. Evans

*Attorney, Agent, or Firm*—Herbert L. Lerner; Laurence A. Greenberg

[57] ABSTRACT

A method of determining area coverage of a printing original having printing areas and non-printing areas thereon, the printing areas being of a different color than that of the non-printing areas, the printing original having a location-dependent inhomogeneity independent of the area coverage, including optically scanning the original for determining a local diffuse reflection of a measured measuring field, the measuring result of the optical scanning being influenced by the inhomogeneity; determining at least two diffuse-reflection values from each measuring field, the diffuse-reflection values differing spectrally from one another in accordance with the color difference; and evaluating the two diffuse-reflection values and separating a component of the measuring result which is influenced by the area coverage, and a component of the measuring result which is influenced by the inhomogeneity; and the device thereof.

8 Claims, 11 Drawing Sheets

METHOD AND DEVICE FOR DETERMINING THE AREA COVERAGE OF AN ORIGINAL

The invention relates to a process for determining an area coverage of a printing original, as opposed to a copy, the printing original being in particular, a printing form of a printing press, preferably an offset printing press, in which the local diffuse reflection of a measured measuring field is determined by optically scanning the original, the original having thereon printing areas of a different color (color differences) compared to the color of non-printing areas of the original, and the original having a location-dependent inhomogeneity which is independent of the area coverage and influences the measuring result of the scanning operation.

The method according to the invention is suitable for determining the area coverage, i.e. for determining the percentage of a printing area relative to the total area under consideration. The method may be used in different technical fields. It can be used, for example, to determine the area coverage of an original printed page. Preferably, however, it is intended to determine the area coverage on a printing form of a printing press, particularly on the printing plate of an offset printing press, prior to the printing process in order to obtain ink-presetting values for ink-metering zones of the inking unit or units of the printing press. The more precisely the area coverage and thus the ink-presetting values can be determined, the sooner it is possible to achieve the run-on production printing state, as a result of which waste production and set-up or make-ready times are reduced.

Under these conditions, it is also possible to print small editions economically.

It has been known heretofore to measure area coverages on printing plates by means of optical diffuse reflection. This is preferably performed zonally in accordance with the ink-metering zones which are to be set on the inking unit of the printing press. For this purpose, each zone of the printing plate is suitably illuminated, and the light reflected by the surface of the printing plate is measured by a measuring head. Preferably, the measuring head has a photodiode for detecting the diffuse reflection. The measured intensities are compared with previously measured reference intensities. One reference intensity originates from a so-called full-tone area, i.e. an area that has an area coverage of 100%. Another reference intensity is formed by a so-called zero-percent area, which does not conduct ink during printing; its area coverage, therefore, is 0%. The full-tone area and the zero-percent area form two extreme values, which are used to calibrate the measuring head. Signals from the measuring head which are based on an area coverage lying between the extreme values can be graded on a percentage basis due to the calibration, i.e. the percentage area coverage corresponding to these signals can thus be determined. With the heretofore known method, therefore, it has been necessary to measure the local diffuse reflection for a full-tone area and for a zero-percent area, for example at the edge of the plate in the non-image area. When the area coverage of the image is then calculated, use is made of the reference areas lying at the edge of the plate in determining the area coverage. A disadvantage is that, in particular, non-image areas of the printing plate (zero-percent areas) have locally different intensity characteristics, which are referred to hereinafter as inhomogeneities, with the result that it is not possible to assume the same reference at all places on the printing plate. It would be ideal if the reference could be determined in the same measuring field in which it is also intended to establish the area coverage. Because this is the measuring field in which the image lies, however, exceptions a side, it cannot contain a full-tone or zero-percent area. If these were to be generated there, the printed image would exhibit a patch of ink or an ink-free area, respectively, at that location. This is not only nonsensical because the printed image would thus be impaired, but also results in a falsification of the respective zonal area coverage.

Due to the locally different reference intensities, the area coverage can only be determined approximately, namely within a relatively wide tolerance band. The zero-percent area reference is particularly critical, because, when compared with a full-tone reference, it is subject to considerably greater local variation and, for an identical absolute magnitude of the error, leads to greater relative errors.

A method of determining an average zonal area coverage has become known heretofore from German Published, Non-Prosecuted Application (DE-OS) 36 40 956, in which zonal scanning of the printing form of a printing press is accomplished by means of a sensor, and in which a zero-percent reference is determined from the edge of the plate or at a measuring point of maximum diffuse reflection. Thereafter, there is a further measurement of the zero-percent reference with additional filtering. The image on the printing plate is then scanned zonally by the sensor and the thus determined measured values are normalized to the transmission curve of the filter. By averaging all of the normalized measured values for the respective inking zone, the degree of area coverage is then calculated and ink-presetting values for the printing press are obtained therefrom. Errors resulting from inhomogeneities in the surface of the printing plate have a distorting effect on the measuring result.

It is accordingly an object of the invention, therefore, to provide a method as well as a device in which inhomogeneities in the original, particularly in a printing form, are taken into account and wherein, therefore, the accuracy of the measuring result is improved. It is intended, in particular, to take into account such inhomogeneities in basically non-image areas of the printing-plate surface, thereby decisively improving the critical measurement of small area coverages.

With the foregoing and other objects in view, there is provided, in accordance with the invention, a method of determining area coverage of a printing original having printing areas and non-printing areas thereon, the printing areas being of a different color than that of the non-printing areas, the printing original having a location-dependent inhomogeneity independent of the area coverage, which comprises optically scanning the original for determining a local diffuse reflection of a measured measuring field, the measuring result of the optical scanning being influenced by the inhomogeneity; determining at least two diffuse-reflection values from each measuring field, the diffuse-reflection values differing spectrally from one another in accordance with the color difference; and evaluating the two diffuse-reflection values and separating a component of the measuring result which is influenced by the area coverage, and a component of the measuring result which is influenced by the inhomogeneity.

The printing original, such as a printing form, may be of such construction that the printing and/or the non-printing areas are tinted, the printing and/or the non-printing areas being of different chrominance. On the basis of the chromatically different areas and the spectral evaluation of the diffuse reflection, it is possible, at each measuring field under consideration, to distinguish whether the measuring result has been influenced by an inhomogeneity. If that is so, i.e. if there is an inhomogeneity, this can be determined and the measuring result can be suitably corrected so that, finally, it is possible to determine the actually existing area coverage of the measuring field which is involved. The measuring result is thus much more accurate, so that, basically, it is possible to determine error-free ink-presetting values for the inking unit or units of an offset printing press. Consequently, the run-on or production printing state can be achieved more quickly after the printing press has been set up.

Brief set-up times and only a small amount of waste production are consequences thereof. Tinting of the printing form is currently more-or-less standard procedure in order to make the image visible and is accomplished, for example, by tinting the photoresist which forms the ink-conducting areas of the printing form. Specific use of this tinting is made in accordance with the invention.

As mentioned hereinbefore, tinting can be performed especially with a diazo lacquer which is already used by printing-plate manufacturers. This photoresist presently used, among other things, to make the image visible, is therefore also employed in accordance with the invention.

What is fundamental to the invention, however, is that tinting results in a color difference, i.e. not only in a color gradation (light-gray to dark-gray, for example).

Whereas the color of the photoresist in relation to a non-printing zero-percent area was irrelevant in the prior art, there must however, be a color difference between the aforementioned areas in accordance with the invention of the instant application. In the prior art, it was sufficient, for example, for the zero-percent areas to be light-gray and for the printing areas (those with photoresist) to be dark-gray, because, due to this difference in tone, the image was discernible and it was also possible to perform the previously mentioned intensity measurement in order to determine the area coverage. It is not possible, however, then to perform a colorimetric measurement. This is an essential element of the invention of the instant application, however, making it possible to detect inhomogeneities. With the heretofore known methods, inhomogeneities, such as a darker-colored zero-percent area situated opposite the plate edge in the region of the image, were viewed as measuring fields having an area coverage, i.e. the existing inhomogeneity was incorrectly interpreted, with the result that measuring errors were unavoidable.

In accordance with another mode of the invention, the method includes, for evaluation purposes, forming the diffuse reflection of the respective measuring field of the following components: a diffuse reflection of a full-tone area weighted by the associated area coverage, and a diffuses reflection of a non-printing or zero-percent area weighted by a remaining area component and weighted by a factor describing the inhomogeneity.

In accordance with a further mode of the invention, the measuring result determined by the optical scanning is composed of:

$$S=f_D\,V+(1-f_D)(1-\gamma)H,$$

wherein

S is a signal corresponding to the measuring result,

V is a signal corresponding to the full-tone area, $f_D$ is the area coverage, $\gamma$ is the inhomogeneity, and H is a signal corresponding to the zero-percent area.

In accordance with an additional mode of the invention, the method includes determining the area coverage zonally, and determining ink-presetting values for ink-metering zones of an inking unit of the printing press from values of the zonal area-coverage.

In accordance with an added mode of the invention, the method comprises determining from the respective measuring field an additional spectrally differing diffuse-reflection value, the additional diffuse-reflection value taking into account a local change in the diffuse reflection of a respective ink-conducting and printed area. This ensures the determination of inhomogeneities within the full-tone areas and the elimination thereof during the measurement. However, such errors which are based on inhomogeneities of full-tone areas are very much smaller than of zero-percent areas, so that, although a further improvement in the accuracy of the measuring result is achieved, this improvement is not as striking as in the case of the zero-percent areas or areas with little area coverage.

Particularly good results can be achieved if the image has a relatively low global area coverage, because, in this case, the elimination of the inhomogeneity errors becomes correspondingly apparent. In accordance with yet another mode of the invention, the method includes, in the case of an original of globally high area coverage, additionally taking into account the measuring result of a spectrally independent optical measurement of the area coverage. This means, therefore, that, using both the method according to the invention and also the heretofore known method of the prior art, the area coverages are determined and the results of both methods are used in the final determination of the area coverage. If the printing form does not exhibit a color difference, but only color gradations (gray on gray, for example), then it is still possible, using the hereinafter discussed device according to the invention, to work according to the conventional aforementioned, so-called one-filter process.

In order to improve the determination of the area coverage, in accordance with yet a further mode of the invention, the original has additional measuring fields adjacent the first-mentioned measuring field, and the method includes using the inhomogeneities of the additional adjacent measuring fields for smoothing in determining the inhomogeneity of the first-mentioned measuring field. This takes into account that the inhomogeneities between adjacent measuring points do not normally undergo a sudden or abrupt, but rather a steady change, with the result that "outliers" due to measuring errors or the like do not have a serious impact. To this extent, it is advantageous if, initially, a local inhomogeneity distribution is determined by determining the inhomogeneities of the entire original (particularly a printing plate). From this, in accordance with yet an added mode of the invention, the original has additional measuring fields adjacent the first-mentioned measuring field, and the method includes, for determining the local area coverage, forming pseudo-zero-percent references and, by smoothing, weighting or rating, adjusting them to determined inhomogeneities of the adjacent measuring fields. A provisional pseudo-zero-percent reference is thus determined at each location. "Pseudo" means that this zero-percent reference was determined only indirectly, because, of course, the image cannot be "removed", and "provisional" means that the thus obtained pseudo-zero-percent references are subsequently corrected by smoothing, weighting or rating by means of inhomogeneities adjacent to each location under consideration, with the result that, in the end, there is a final pseudo-zero-percent reference for each measuring field. This then ensures the performance of the final determination of the respective local area coverage.

In accordance with another aspect of the invention, there is provided a device for determining area coverage of originals comprising at least one measuring head for optically scanning the original, the measuring head including a spectrally operating diffuse-reflection light detector for determining a plurality of spectrally different measuring results based upon different spectral evaluation from respective optically scanned measuring fields.

In accordance with another feature of the invention, the device includes a filter arrangement for implementing the different spectral evaluation. The filter arrangement may comprise a plurality of filters, so that a different filter can be used for each measurement. It is also possible, however, to proceed in such a fashion that one of the measurements is performed without a filter and one or more other measurements are performed with a filter. Furthermore, it is possible for the diffuse-reflection light detector to comprise a plurality of light-sensitive elements, to which the diffuse reflection is supplied via the corresponding filters. This has the advantage that a plurality of measurements can be carried out simultaneously. Alternatively, it is also conceivable for the diffuse-reflection light detector to comprise just one light-sensitive element and for the filters to be adapted to be pivoted into the optical path of the element. In the latter case, however, the various measurements of each measuring field can only be performed consecutively.

In accordance with still a further feature of the invention, there is provided an illuminating device for implementing the spectral evaluation, the illuminating device having means for emitting spectrally different light.

In accordance with still an added feature of the invention, the diffuse-reflection light detector comprises detecting elements of spectrally different sensitivity for implementing the spectral evaluation.

In accordance with still an additional feature of the invention, the diffuse-reflection light detector comprises at least one photodiode.

In accordance with yet another feature of the invention, the diffuse-reflection light detector comprises first and second diodes, and the measuring head also comprises a beam splitter for supplying the diffuse reflection to the first photodiode directly and to the second diode via a filter associated therewith.

In accordance with an alternate feature of the invention, the diffuse-reflection light detector comprises first and second diodes having respective filters associated therewith, and the measuring head also comprises a beam splitter for supplying the diffuse reflection to the first and second diodes via the filters, respectively, the filters having spectrally different characteristics. It is thus possible to measure the diffuse reflection of a measuring field in a spectrally different manner simultaneously.

In accordance with yet a further feature of the invention, there is provided a third photodiode having a further spectrally different filter associated therewith, and the measuring head comprises a further beam splitter for supplying the diffuse reflection to the third photodiode via the further spectrally different filter. Consequently, the first photodiode receives the diffuse reflection unfiltered, the second photodiode receives it via a filter, and the third photodiode receives it via a further filter, which differs from the first filter in the filtering characteristic thereof.

In order to allow the entire original, particularly the image of the printing form, to be measured area-wide comprehensively in a brief interval of time, in accordance with yet an added feature of the invention, the device includes a plurality of juxtaposed measuring heads movable in relation to the original. Alternatively, the measuring heads may also be fixed in position and the original may be moved. Preferably, the row of measuring heads is of such length that the length of the image and/or the width of the image is measured in its entirety. The measuring heads are movable either in the printing direction of the printing form or transversely with respect to the printing direction. Alternatively, however, it is also possible, for example, for one or more measuring heads for optical scanning to cover different partial areas of the printing form on a meander-shaped path across the printing form or during forward and backward movement by displacement of a sensor arrangement.

The filter or the filters may preferably be in the form of cut-off filters or tristimulus filters, with special attention being paid to their mutual travel paths.

Alternatively and in accordance with another feature of the invention, the filter arrangement comprises means for spectroscopically measuring the diffuse reflection and combining and weighting adjacent wavelength intervals.

In accordance with a concomitant feature of the invention, the filter arrangement comprises a spectrophotometer for spectroscopically measuring the diffuse reflection, and a downline computer for combining and weighting adjacent wavelength intervals.

According to a further development of the invention, it is also possible, based upon the reference signals for the full-tone and zero-percent areas, to detect which type of plate (i.e. from which manufacturer or of which material) is being used. To this extent, the device according to the invention can also be used to perform printing-plate identification. It is also possible in this connection, after a plate has been detected, to make advance approximative allowance for the anticipated inhomogeneities i.e. the characteristic data on these inhomogeneities is stored and is used when these types of plate are again employed. This permits, for example, a plate-specific evaluation of the measuring result using a simpler algorithm. Other features which are considered as characteristic for the invention are set forth in the appended claims.

Although the invention is illustrated and described herein as embodied in a method and device for determining the area coverage of an original, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
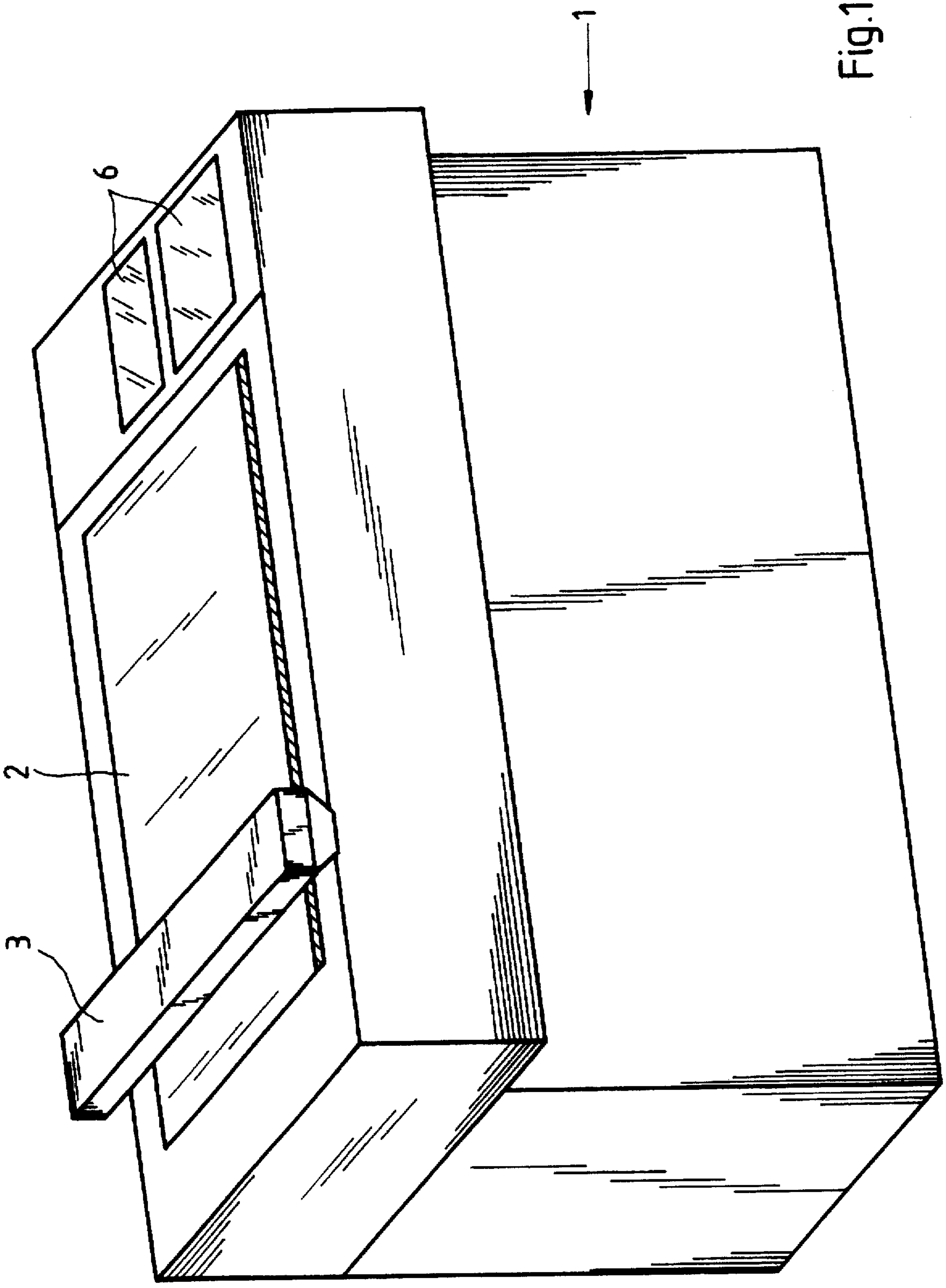
FIG. 1 is a diagrammatic front, side and top perspective view of a device for determining area coverage of a printing plate for an offset printing press.

Referring now to the drawings and, first, particularly to FIG. 1 thereof, there is shown therein a device with which it is possible to determine a zonal area coverage of an original, particularly a printing plate of an offset printing press.

The device includes a desk-shaped measuring table 1. A printing plate 2 to be measured is laid on the measuring table 1 and is pneumatically held thereon by vacuum. Appropriate suction channels are provided in the measuring table 1 for this purpose. A measuring bar 3 is movably mounted on the measuring table 1. It is apparent from a study of FIGS. 2 and 3 that the measuring bar is movable in the directions of the double arrow 4. Assuming that the arrow 5 indicates the printing direction of the printing plate 2 held on the measuring table 1, the measuring bar 3 is thus displaceable transversely with respect to the printing direction.

Figure 2:
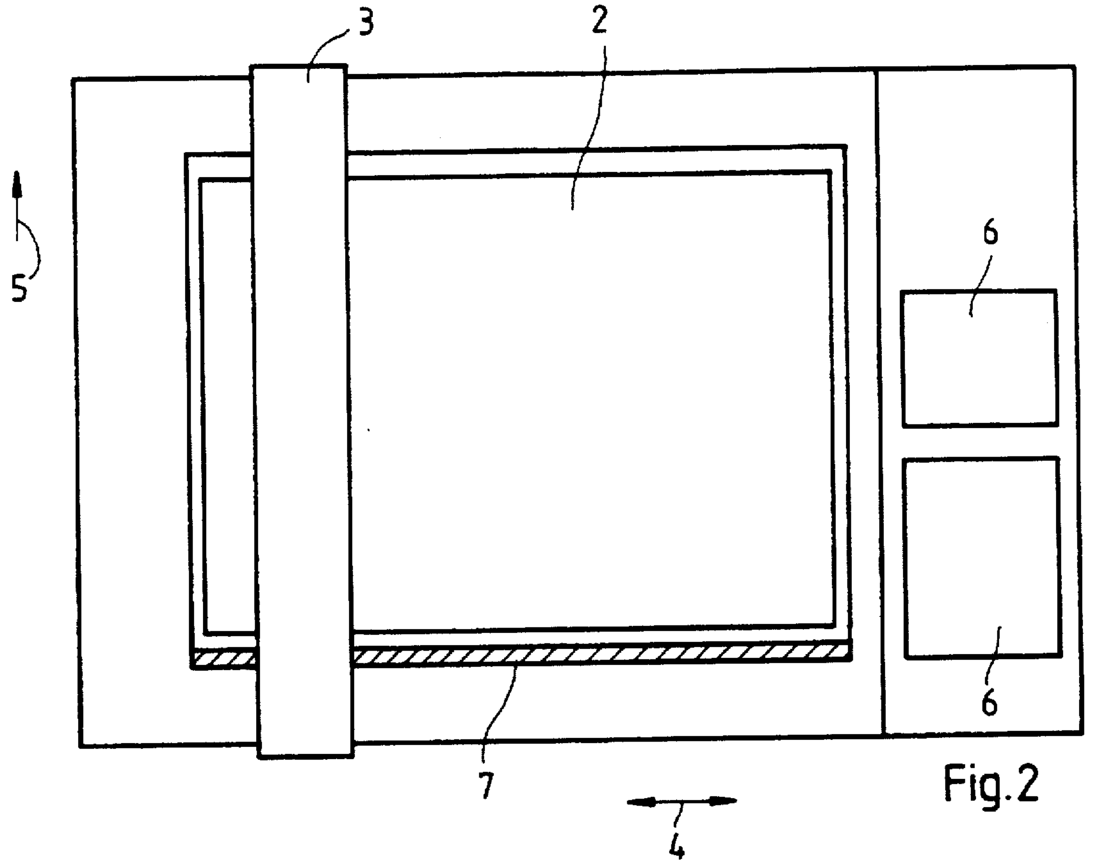
FIG. 2 is a top plan view of FIG. 1.
Figure 3:
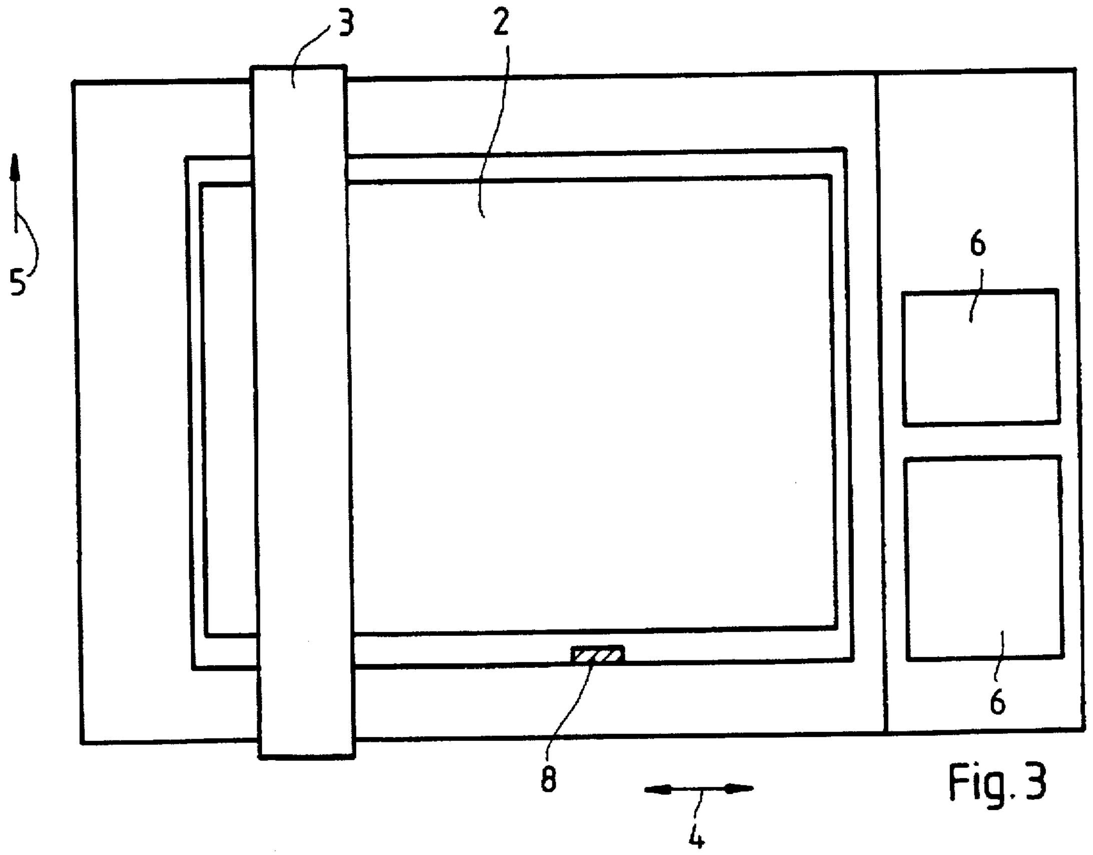
FIG. 3 is a top plan view of another embodiment of the device according to the invention.

It is, of course, also possible to provide a non-illustrated further embodiment of the invention wherein the measuring bar 3 is disposed at angle of 90° to that of the respective embodiment shown in FIGS. 1 to 3, with the result that it can be displaced opposite to or in the printing direction.

Control and indication fields 6 which are not shown in great detail, are further provided on the necessary table 1. Moreover, a calibration strip 7 (FIG. 2) or a calibration field 8 (FIG. 3) is provided on the measuring table 1 or on the printing plate 2.

A full-tone reference area required for calibration, as mentioned hereinbefore, may be disposed at the edge of the plate, and it is possible to provide the full-tone reference area, for example, by sliding on a calibration-field mask; this might possibly simplify the manufacture of the printing plate.

Figure 4:
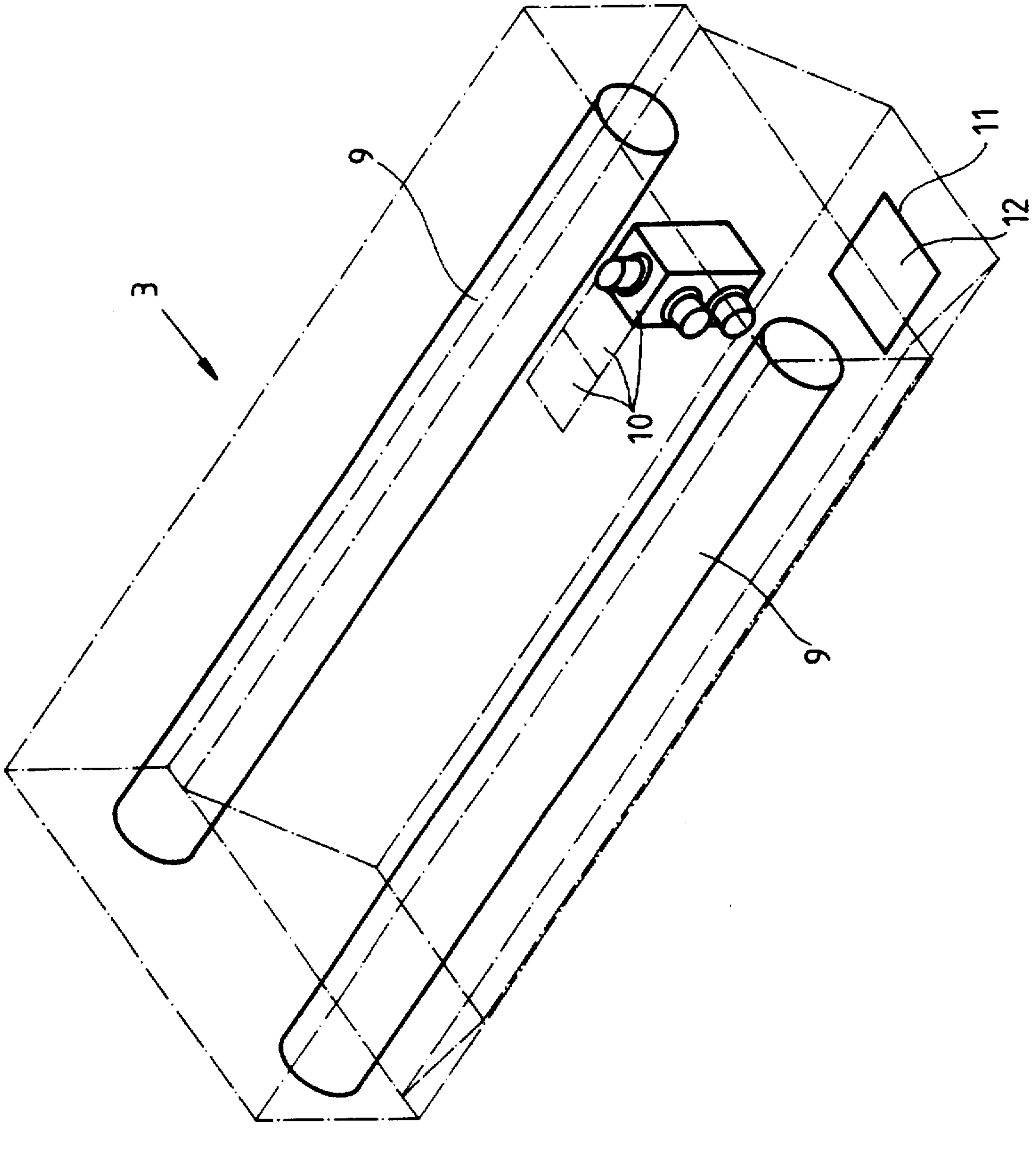
FIG. 4 is an enlarged fragmentary view of FIG. 1 showing a measuring bar being provided with a diffuse-reflection light detector.

FIG. 4 shows, byway of example, an embodiment of the measuring bar 3 in a diagrammatic view. The measuring bar 3 has two light sources 9, which are preferably in the form of fluorescent lamps. A multiplicity of measuring heads 10 are disposed in a line, somewhat between the two fluorescent lamps 9, in the longitudinal direction of the measuring bar 3. Only one of the measuring heads 10 is shown in detail in FIG. 4. Only one measuring head may be used, if it is displaceable in the longitudinal direction of the measuring bar so that the printing plate can be fully scanned, for example, in a meander-shaped manner. Altogether, it is also possible, for example, for 32 measuring heads to be juxtaposed in-line, with optical fields of view thereof being limited, for example, to 32.5·32.5 $mm^2$ by means of an aperture grating 11. Assuming that this field-of-view length corresponds to the width of an inking zone of the non-illustrated offset printing press, it is thus possible for a zone of the printing plate 2 to be measured in a given position of the measuring bar 3. If the measuring bar is moved a distance of one zone after the preceding zone has been measured, it is then possible for the adjoining zone to be optically scanned. Each individual zone is subdivided into a suitable number of measuring fields 12, which correspond to the openings in the aperture grating 11. In the aforementioned embodiment, for example, there are 32 measuring heads and thus also 32 measuring fields 12 for each position of the measuring bar 3.

Figure 5:
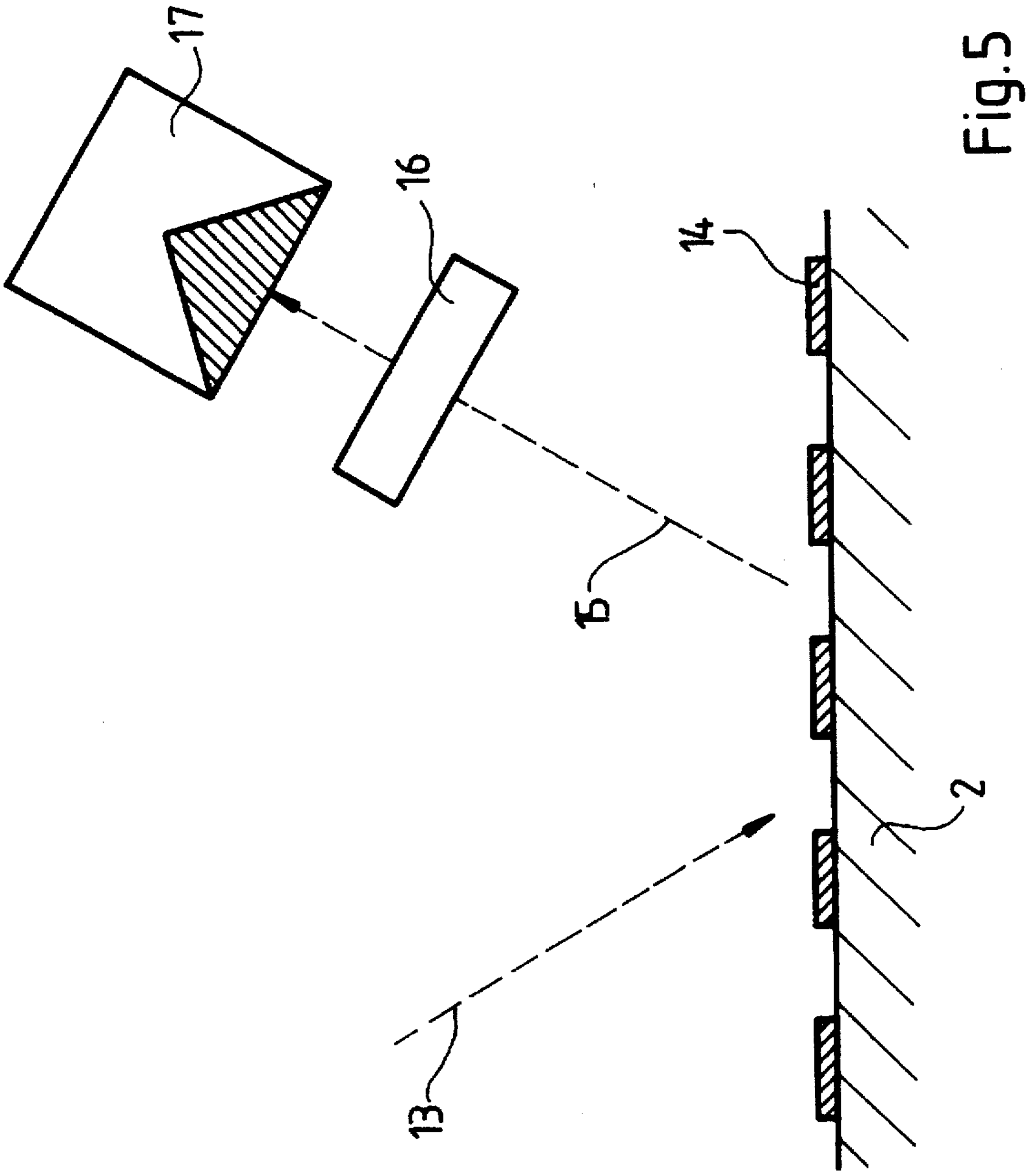
FIG. 5 shows a basic drawing to illustrate the diffuse reflection.

Before the precise construction of the measuring bar 3 is discussed in greater detail, the diffuse-reflection measurement possible with the measuring table 1 is clarified with reference to FIG. 5. The light 13 from the light sources 9 shown in FIG. 4 strikes the surface of the printing plate 2, which, depending upon area coverage, is provided with a corresponding multiplicity of halftone dots or full-area components 14 of given size. The incident light 13 is reflected in a spectrally varying manner by the surface of the printing plate 2, in accordance with the existing area coverage. This reflected light 15, if necessary or desirable, passes through a filter 16 (to be discussed in greater detail hereinafter) and then reaches a diffuse-reflection light detector 17, which is located in the respective measuring head 10.

Figure 6:
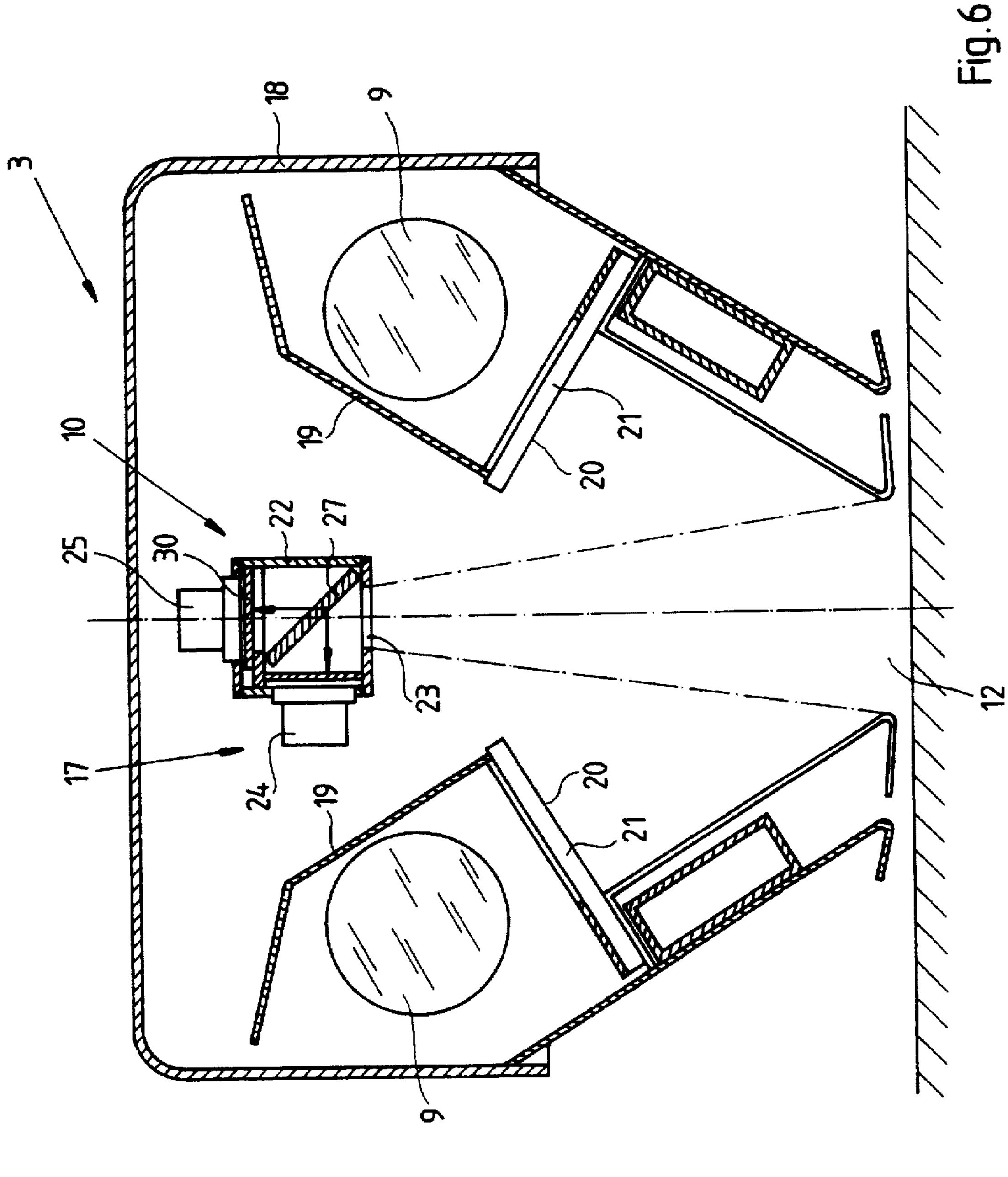
FIG. 6 is an enlarged cross-sectional view of the measuring bar of FIG. 4 having two diffuse-reflection light detectors.

FIG. 6 illustrates the construction of the measuring bar 3. The measuring bar 3 has a housing 18 in which the measuring heads 10 are accommodated. The two light sources 9 are likewise disposed in the housing 18 and are shielded, for example, are provided with diffusing screens 21. A diffuse light is thus radiated from the light sources 9 through the diffusing screens 21 onto the original which is to be scanned.

Figure 7:
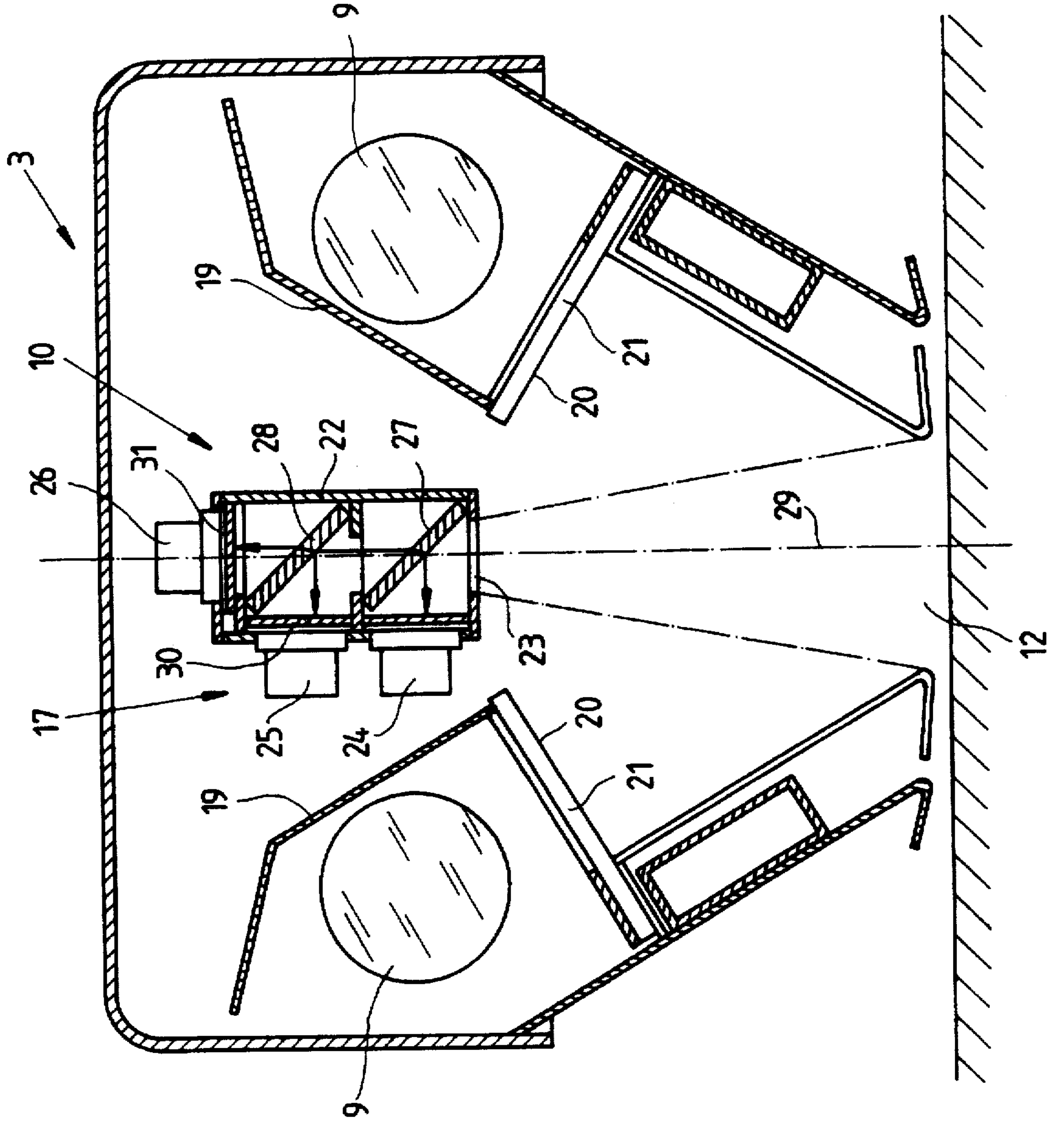
FIG. 7 is a view like that of FIG. 6 of another embodiment of the measuring bar.

The two embodiments of the measuring bars 3 shown in FIGS. 6 and 7 differ from one another by varying constructions of the measuring heads 10 of the embodiment in FIG. 7. The measuring head 10 has a housing 22 which is provided at its lower end with a light inlet opening 23. If required or desirable, it is also possible for a lens system to be provided thereat and/or in front of photodiodes 24, 25 and 26 of the respective measuring head 10. Each measuring head 10 thus includes the diffuse-reflection light detector 17 (note FIG. 5), which, in the embodiment of FIG. 7, is formed of the three photodiodes 24, 25 and 26. Two beam splitters 27 and 28 are disposed inside the housing 22. The layout is such that the reflected light incident to the light inlet opening 23 initially strikes the beam splitter 27, whereat it is split so that some of it reaches the photodiode 24. The remainder passes through the beam splitter 27 along an optical axis 29 and reaches the beam splitter 28, whereat it is divided so that one part of it reaches the photodiode 25 and another part of it passes through the beam splitter 28 and reaches the photodiode 26. Filters 30 and 31, respectively are positioned in front of the photodiodes 25 and 26. The light fed from the beam splitter 27 to the photodiode 24 does not pass through any filter. However, it is also possible to provide an embodiment wherein, as well, a filter may be provided, particularly if there is to be a matching of the signal level. Irrespective of whether two filters 30 and 31 and no further filter or an additional third filter are provided, the measuring head 10 in FIG. 7 is by definition a three-filter measuring head (if no third filter is provided, the spectral sensitivity of the photodiode 24 can be regarded as a filter).

The embodiment of FIG. 6 differs from the aforedescribed embodiment with regard to the measuring head 10, in that there are only two photodiodes, namely the photodiode 24 and the photodiode 25. The photodiode 25 is not positioned at the side of the housing 22, as in the embodiment of FIG. 7, but at the end of the head 10. In addition, only one beam splitter 27 is provided. The light coming in through the light inlet opening 23 reaches the photodiode 24 unfiltered and, due to the beam splitter 27, some of it also reaches the photodiode 25 after passing through the filter 30. In accordance with the aforementioned embodiment of FIG. 7, a filter may also be positioned in front of the photodiode 24 in the embodiment of FIG. 6. The embodiment of FIG. 6 thus involves a two-filter measuring head (even when only one filter 30 is provided; in accordance with the terminology employed hereinbefore, the spectral sensitivity of the photodiode 24 may be regarded also as a filter).

Figure 10:
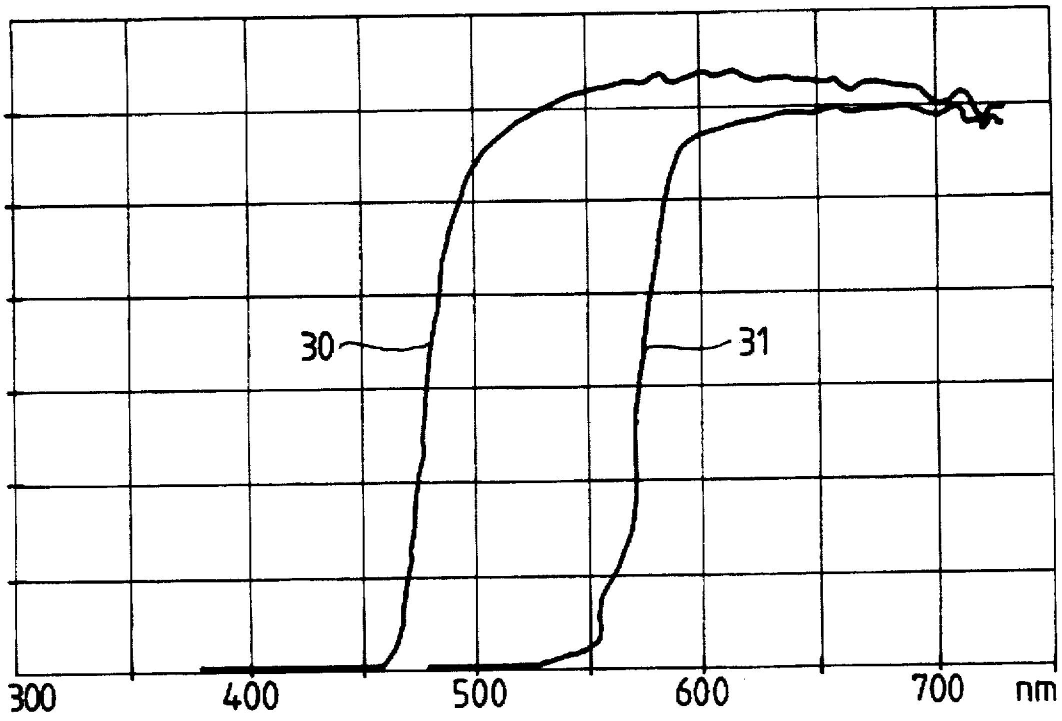
FIG. 10 is a plot diagram of an example of a special transmission of the two filters used in the measuring head of FIG. 9.

It is essential that the spectral transmissions of the individual filters 30 and 31 (and of the respective third filter assigned to the photodiode 24) are different. This is particularly evident from FIG. 10, which shows the filter characteristics of the filters 30 and 31, respectively (the corresponding reference characters are assigned to the respective characteristic curves).

Figure 8:
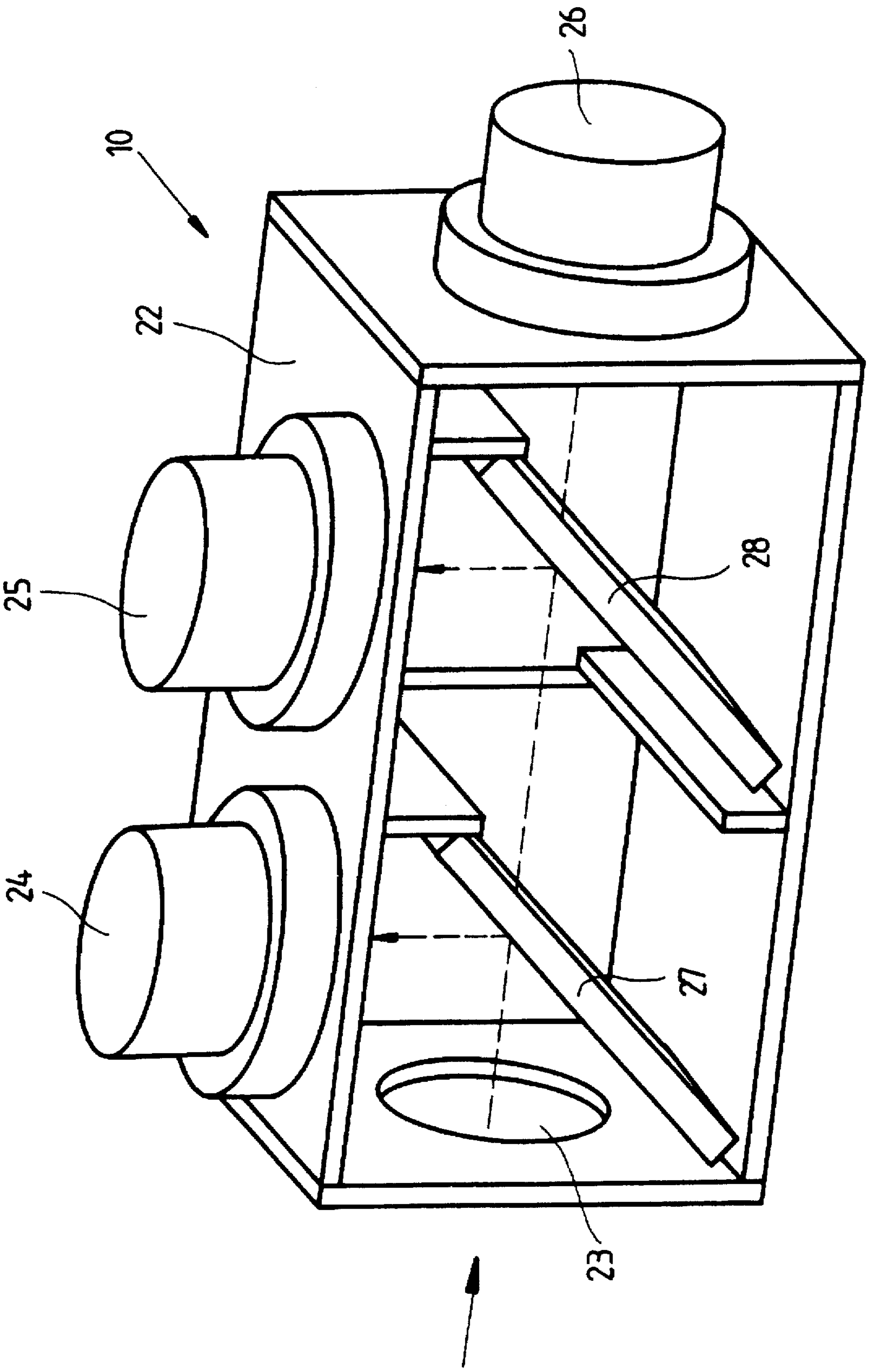
FIG. 8 is a fragmentary enlarged front side and top perspective view of FIG. 7 showing a diffuse-reflection light detector forming part of the measuring bar.
Figure 9:
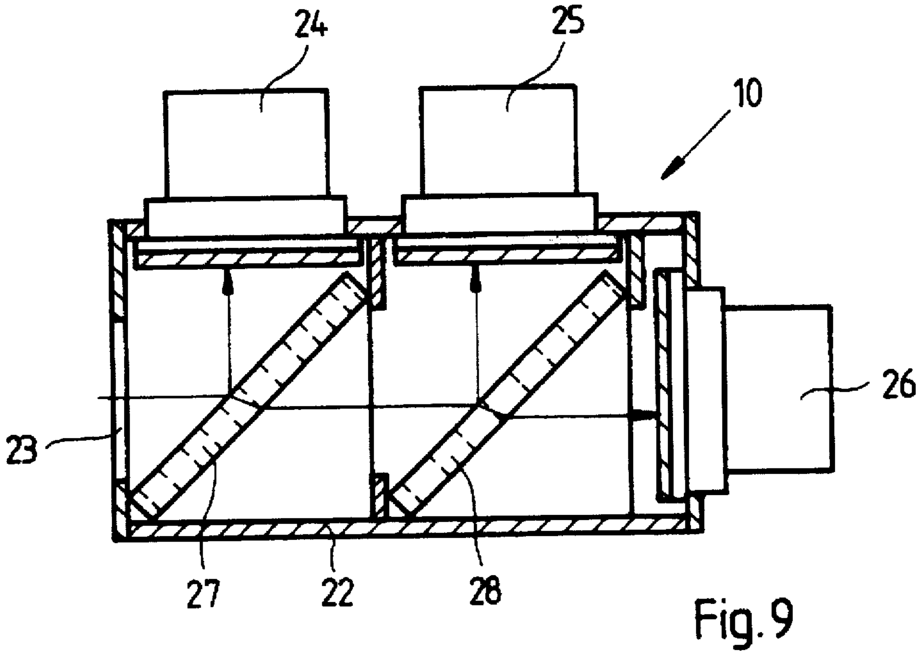
FIG. 9 is a reduced longitudinal sectional view of FIG. 8.

FIGS. 8 and 9 once again illustrate the construction of the three-filter measuring head 10.

A further non-illustrated embodiment of the invention includes a measuring head having just one photodiode with a filter wheel provided with a plurality of different filters.

Before discussing the invention further in greater detail, a description of the heretofore known method for determining the area coverage of a printing plate is believed to be in order because the differences thereof with respect to the invention will then become more apparent.

As explained hereinbefore, the area coverages and the zonal area coverages, respectively, on printing plates are measured by optical diffuse reflection, use being made of the fact that, in order to make the image visible, the ink-conducting location during printing are tinted by the printing-plate manufacturer by means of a photoresist and, respectively, differ in color from the ink-conducting areas. The diffuse reflection of a measuring location (measuring field 12) having a specific area coverage is made up of two components:

a) the diffuse reflection of the local full-tone area component weighted by the area coverage; and b) the diffuse reflection of the local non-printing so-called zero-percent area component weighted by the complement of the area coverage.

The signal received at the diffuse-reflection light detector 17 of FIG. 5 is then $$S=\int_{\lambda_1}^{\lambda_2}\Phi_0(\lambda)\beta(\lambda)\tau(\lambda)S_E(\lambda)d\lambda$$

where $\Phi_0$ is the spectrum of the incident light; $\beta$ is the diffuse reflection of the measuring field 12; $\tau$ is the transmission of a filter; $S_E$ is the spectral sensitivity of the photodiode; and $\lambda$ is the wavelength. The integration limits $\lambda_1$ and $\lambda_2$ lie typically within the visible range and are adapted to the spectral curves of the individual terms, respectively. Especially in the case of low area coverage, however, the heretofore known processes are subject to the disadvantage that measuring errors occur. This is attributable principally to the fact that the free, non-printing surface of the printing plate is optically inhomogeneous: the diffuse reflection measured on a zero-percent area may differ locally, i.e. it may not be identical to the zero-percent reference diffuse reflection measured at the edge of the plate.

The aforementioned equation indicates that the received signal S is dependent upon a plurality of parameters. It becomes apparent therefrom that the spectral sensitivity can be achieved by the use of different filters, i.e. $\tau$ variable, $\Phi$ and $S_E$ constant, or also by light of different incidence, i.e. $\Phi$ variable, $\tau$ and $S_E$ constant, or, finally, by varying spectral sensitivity of the photodiodes used in the diffuse-reflection light detector, i.e. $S_E$ variable, $\tau$ and $\Phi$ constant.

A discussion of the process with different filters $\tau$ follows hereinafter.

The signal model of the heretofore known method, which is known also as the one-filter method (with a one-filter measuring head) is as follows (even if there is no filter, the photodiode used for evaluation may be regarded as a filter because of its spectral sensitivity):

$$S=f_D\,V+(1-f_D)H$$

wherein S is the measured signal; H is the zero-percent reference; V is the full-tone reference; and $f_D$ is the area coverage.

With the heretofore known process, it is assumed that the measured diffuse reflection is influenced only by the half-tone dots and by full-tone areas, respectively; the signal S is dependent, therefore, only on the area coverage $f_D$. The aforementioned inhomogeneities are not, therefore, taken into account and enter incorrectly as area coverage into the measurement.

The following value is then obtained as the area coverage $f_D$:

$$f_D=\frac{H-S}{H-V}$$

An inhomogeneity can, however, be taken into account with the heretofore known process if S greater than H is measured, because this results in a negative area coverage, which is physically impossible. To this extent, it is possible in this case to make a correction, albeit an imperfect one. There is no possible way, however, of reliably determining the local zero-percent reference in the measuring field 12 of the image or subject itself. Rather, the zero-percent reference assigned to the corresponding zone is measured at the edge of the printing plate and is then used for the entire zone. For all of the zones, therefore, the corresponding associated references are measured at the edge of the plate; they can then only be used globally within the corresponding zone. The local zero-percent reference of the respective measuring field 12 cannot be determined approximately with the heretofore known method.

The principal deficiency of the heretofore known one-filter method becomes apparent from the foregoing; the correct formula for the local area coverage is namely:

$$f_D(s,z)=\frac{H(s,z)-S(s,z)}{H(s,z)-V(s,z)}$$

where s is the sensor number (number of the corresponding measuring head 10) and z is the zone number. Actually, however, for want of a local reference, the prior art uses;

$$f_D(s,z)=\frac{H(0,z)-S(s,z)}{H(0,z)-V(0,0)}$$

where s=0 signifies the zonal reference.

V(0,0) signifies a single measuring location valid globally for all of the zones.

Whereas the absent local references can still be accepted for the full-tone references; because only minor inhomogeneities occur in the case of full-tone areas, this is not true for the zero-percent references. The following applies:

$$H(s,z)\neq H(0,z),$$

which means that the local reference H(s,z) is, in general, not identical with the zonal reference H(0,z).

According to the invention, in order to achieve improved measurements, the local references are determined, i.e. no use is made of the practice of working with a plate-edge reference and of assigning it to the respective different measuring fields of the corresponding zone.

With the two-filter method according to the invention (which is performed with a two-filter measuring head 10), the local zero-percent reference is determined approximately within the measuring fields 12 of the image or subject on the printing plate 2. This is accomplished based upon a model. A basic assumption, in this regard, is that it is possible to describe the spectral change in the local zero-percent reference in relation to the zonal zero-percent reference by a scalar 1−γ. This principle signifies, with respect to the actual conditions, that the local reference may be lighter or darker than the zonal reference, yet must be identical in color therewith. The signal model according to the invention is as follows:

$$S=f_D V+(1-f_D)(1-\gamma)H,$$

where γ is the inhomogeneity. Furthermore, a so-called pseudo-reference H* can be defined. It results from the following:

$$H^*(x,z)=\{1-\gamma(s,z)\}H(o,z).$$

The pseudo-reference H, (s,z) can be calculated for each measuring point (for each measuring field 12). It is thus local. The reference is "pseudo" because it is not the actual reference, in that the image cannot be "removed" for measuring purposes, but is merely a reference which is spectrally similar to the zonal reference. The following relationship consequently applies:

$$H^*(s,z)\approx H(s,z).$$

For each measuring field 12, it is necessary to measure two signals for the purpose of determining the two unknowns $f_D$ and γ. This is possible with the two photodiodes 24 and 25, and due to the spectral differentiation by the filter 30. With regard to the calculation of the area coverage, there then results the following formula, similar to the one known from the prior art:

$$f_D=\frac{H^*-S}{H^*-V}.$$

Figure 12:
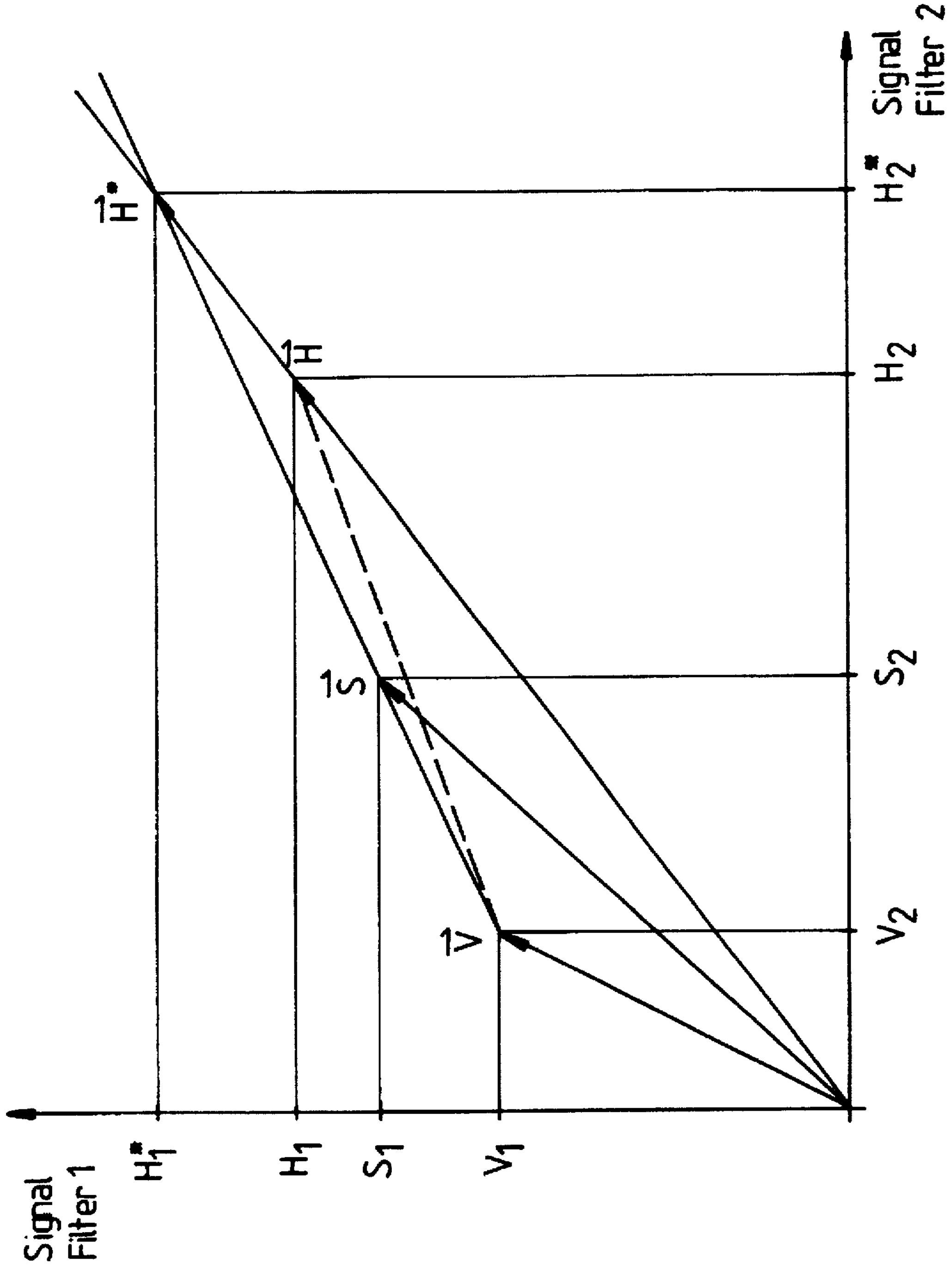
FIG. 12 is a plot diagram of signals from a two-filter measuring head, the plot diagram offering an illustration of the mathematical background of the process according to the invention.

With reference to FIG. 12, the process according to the invention is sought to be illustrated by a two-dimensional signal space. A precondition for the practical measurement is that the printing areas of the printing plate 2 should differ in color from the non-printing areas. For example, assumptions are made that the printing plate is formed of aluminum and its non-printing areas (anodically oxidized aluminum) are gray, and that a blue photoresist (diazo lacquer) is being used and this lacquer is on the printing areas. Because the measuring head 10 has two photodiodes 24 and 25, two signals are recorded for each measuring field; these two signals are represented on the ordinate and the abscissa, respectively, of the coordinate system of FIG. 12. The signals under discussion are a signal from a filter 1, for example, for short-wave-range transmission (this may be the signal from the photodiode 24, which, as explained hereinbefore, may or may not have a filter, as well as a signal from the filter 2, which, for example, in an advantageous manner, transmits light which is complementary to filter 1, that light being received by the photodiode 25. $V_1$ and $V_2$ represent the signals from the photodiodes 24 and 25, which have received reflected light from a full-tone area (full-tone reference). The signals $H_1$ and $H_2$ identify the zonal zero-percent reference. The calibration of the pair of photodiodes 24 and 25 will be discussed hereinafter in greater detail. $S_1$ and $S_2$ represent the signal detected by the measuring head 10 at the measuring field 12 which is currently being locally measured. In the two-dimensional signal space, the received signals result in the vectors $\vec{V}$, $\vec{S}$ and $\vec{H}$. According to the invention, the vector $\vec{H}^*$, i.e. the vector that takes the inhomogeneities into account, must have the same direction as the vector $\vec{H}$. If the vector $\vec{H}$ is extended until it intersects the extended straight line from the final points of the vectors $\vec{V}$ and $\vec{S}$, the result is the final point of the vector $\vec{H}^*$. The latter can, in turn, be split into $H_1^*$ and $H_2^*$. The distance between the final points of the vectors $\vec{H}$ and $\vec{H}^*$, therefore, indicates the correction variable which takes the inhomogeneities into account. According to the signal model shown in FIG. 12, therefore, the vectors $\vec{H}^*$, $\vec{V}$ and $\vec{S}$ lie on a straight line.

The embodiment represented in FIG. 12 can be regarded as a 2-dimensional color space, wherein the angle, for example, of a vector $\vec{S}$ formed from the signals "Filter 1" and "Filter 2", with respect to the axes can be interpreted as the chrominance, and the length of the vector $\vec{S}$ as the intensity. The signals "Filter 1" and "Filter 2" are generated by the spectrally different photodiodes 24 and 25. If filter 1, for example, were to measure in the short-wave spectral range and if the measured area 12, for example, had a higher short-wave blue component, then the associated signal vector would lie above the vector $\vec{S}$ indicated in FIG. 12, because the intensity after the shorter-wave filter would be higher.

It becomes clearly apparent from FIG. 12 that the zero-percent reference is scalable. This means that the vector $\vec{H}$ must be extended for inhomogeneities γ<0 and shortened for inhomogeneities γ>0.

With the so-called $k_f$ criterion, it is possible to check whether the printing plate at hand is "spectrally" measurable at all by the type of process according to the invention. The $k_f$ criterion is defined as:

$$k_f(z)=\text{Maximum}\left\{\frac{H_i(0,z)V_j(0,z)}{V_i(0,z)H_j(0,z)};\frac{V_i(0,z)H_j(0,z)}{H_i(0,z)V_j(0,z)}\right\}$$

where z represents the zone number and i=j represents a signal index. The more the full-tone reference differs in color from the zero-percent reference (always with respect to the filters being used), the $k_f$ criterion is all the more different from one. The $k_f$ criterion is initially calculated zonally, and the mean value is then used. The signals $V_i$ and $H_i$ must be so different that a $k_f$ of at least 1.1 (empirically) should be obtained for a tolerable error sensitivity of the two-filter method according to the invention. If this is not obtained, evaluation is performed exclusively in accordance with the heretofore known one-filter method.

Figure 13A:
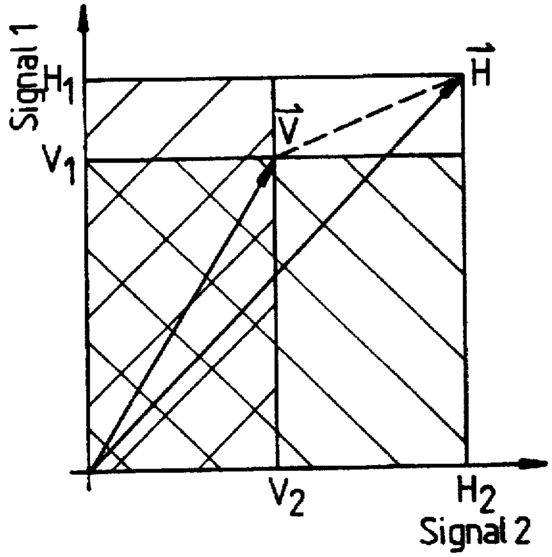
FIGS. 13*a*, *b* and *c* are plot diagrams which illustrate a so-called $k_f$ criterion.
Figure 13B:
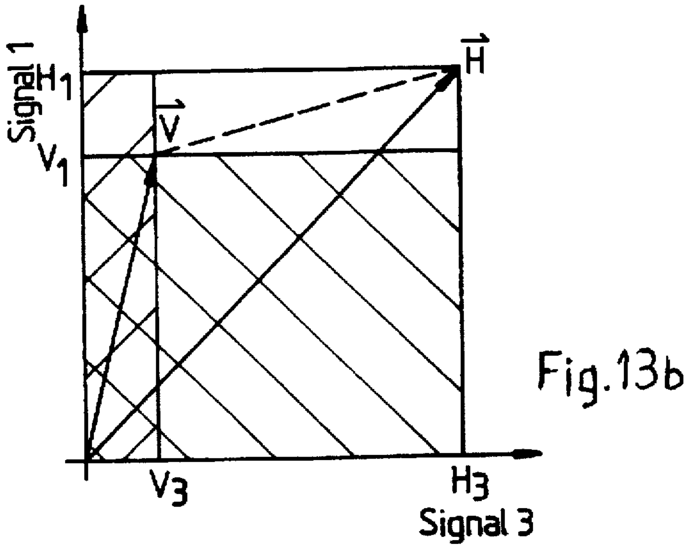
Figure 13C:
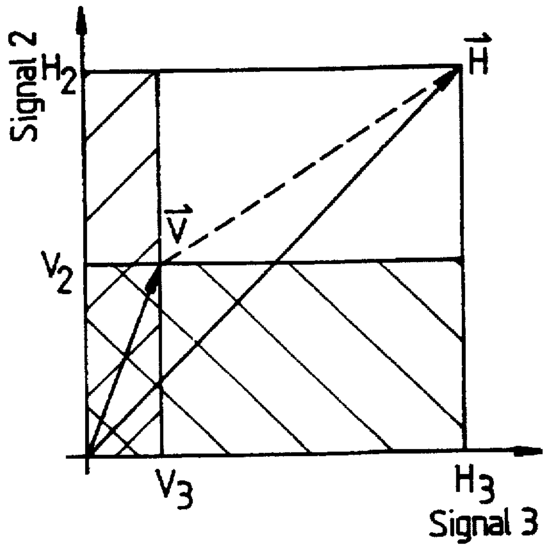

This $k_f$ criterion is illustrated geometrically with reference to FIGS. 13a, b and c. The products $H_i \cdot V_j$ and $H_j \cdot V_i$, respectively, are shown as shaded areas in the signal space for the three possible combinations. The value of the $k_f$ criterion corresponds to the maximum quotient of these area pairs. Allowance is thus made for the dynamic and spectral measurability (embodied by the differential vector $\vec{H}-\vec{V}$ and the angle between both vectors, respectively). If three diodes and two filters are used, the combination of the pair of filters with the highest $k_f$ value is selected.

According to the invention, therefore, provision is made, in accordance with the spectral effect, for the inhomogeneity to be distinguished from a change brought about by the area coverage.

The following procedure is adopted in order to calibrate the arrangement:

The measuring bar 3 is moved across a calibration area, which either lies separate from the printing plate 2 likewise on the measuring table 1 (in this case, however, it must be precisely of the same plate type as the printing plate 2 which is used) or, alternatively, is advantageously integrated into the printing plate 2. This calibration area is formed, for example, for each zone, half thereof of a full-tone area and the other half thereof of a zero-percent area, each of which must be large enough to completely fill the optical field of view of the photodiodes 24 and 25. The intensity of the reflected light on each of the two reference areas is then measured. This provides the data $\vec{H}(0,z)$ for the zero-percent area and $\vec{V}(0,z)$ for the full-tone area, which are stored for subsequent evaluation.

A measuring run is then performed wherein the local area coverage $f_D$ (s,z) and the local inhomogeneity $\gamma$ (s,z) are calculated for each measuring field (measuring location based upon the signal model.

The final evaluation takes into account, in accordance with the invention that the inhomogeneities c (s,z) define so-called pseudo-zero-percent references $\vec{H}$ (s,z) on the spectral basis, according to the invention, of the zonal zero-percent references $\vec{H}$ (0,z) within the printing plate. These pseudo-zero-percent references $\vec{H}$, indicate what the printing plate 2 would look like without an image or subject if the diffuse reflection of non-image or subject-free areas within the printing plate 2 were to emerge, in a scaled manner, from the zero-percent diffuse reflection of the edge of the printing plate. From the determination of the non-image or subject-free so-called zero-percent plate it is then possible to detect the existing inhomogeneities locally.

In order to obtain an especially reliable measuring result, it is possible, in accordance with a further development of the invention, for the thus determined zero-percent plate additionally to undergo smoothing, weighting or rating, i.e. the locally determined inhomogeneities are compared with adjacent inhomogeneities and abrupt or sudden variations are reduced. Various heretofore known mathematical methods may be used for such smoothing.

Smoothing may be weighted so that the signals from a measuring location (s,z) have a high weighting if the area coverage initially determined at that location (s,z) is low, because it is precisely there that the inhomogeneities of the non-image or subject-free area can be measured better.

If use is made of a measuring head 10 as shown in FIG. 7 (three-filter measuring head), according to another embodiment, then it is possible to take into account the inhomogeneity not only of zero-percent areas, but also of full-tone areas. Of course, the effect, especially on the measuring result, of the inhomogeneity of full-tone areas is considerably smaller in comparison with the inhomogeneity of zero-percent areas.

If the two-filter model is extended to include another filter, an additional freedom (apart from the area coverage $f_D$ and the inhomogeneity $\gamma$) is obtained for the signal model with which it is possible to simulate the actually existing diffuse-reflection spectrum of a measuring field by conventional reference diffuse reflections. In this case, the signal model looks as follows:

$$\vec{\beta}=f_D(1-\delta)\vec{\beta}_v+(1-f_D)(1-\gamma)\vec{\beta}_H.$$

Scaling in the manner of inhomogeneities is thereby able to be introduced not only for a zero-percent area (identified by $\gamma$), but also for full-tone areas (identified by $\delta$).

The following then results:

$$S=f_D\,(1-\delta)V+(1-f_D)(1-\gamma)H$$

or, written as a three-dimensional vector:

$$\vec{S}=f_D\vec{V}_x+(1+f_D)\vec{H}^*$$

where:

$$\vec{V}^*=(1-\delta)\vec{V}$$

$$\vec{H}^*=(1-\gamma)\vec{H}$$

Spectral changes in all signal-determining parameters to a first approximation are thus detected thereby and not only for the zero-percent diffuse reflection, as in the signal model that has been described in detail.

Figure 11:
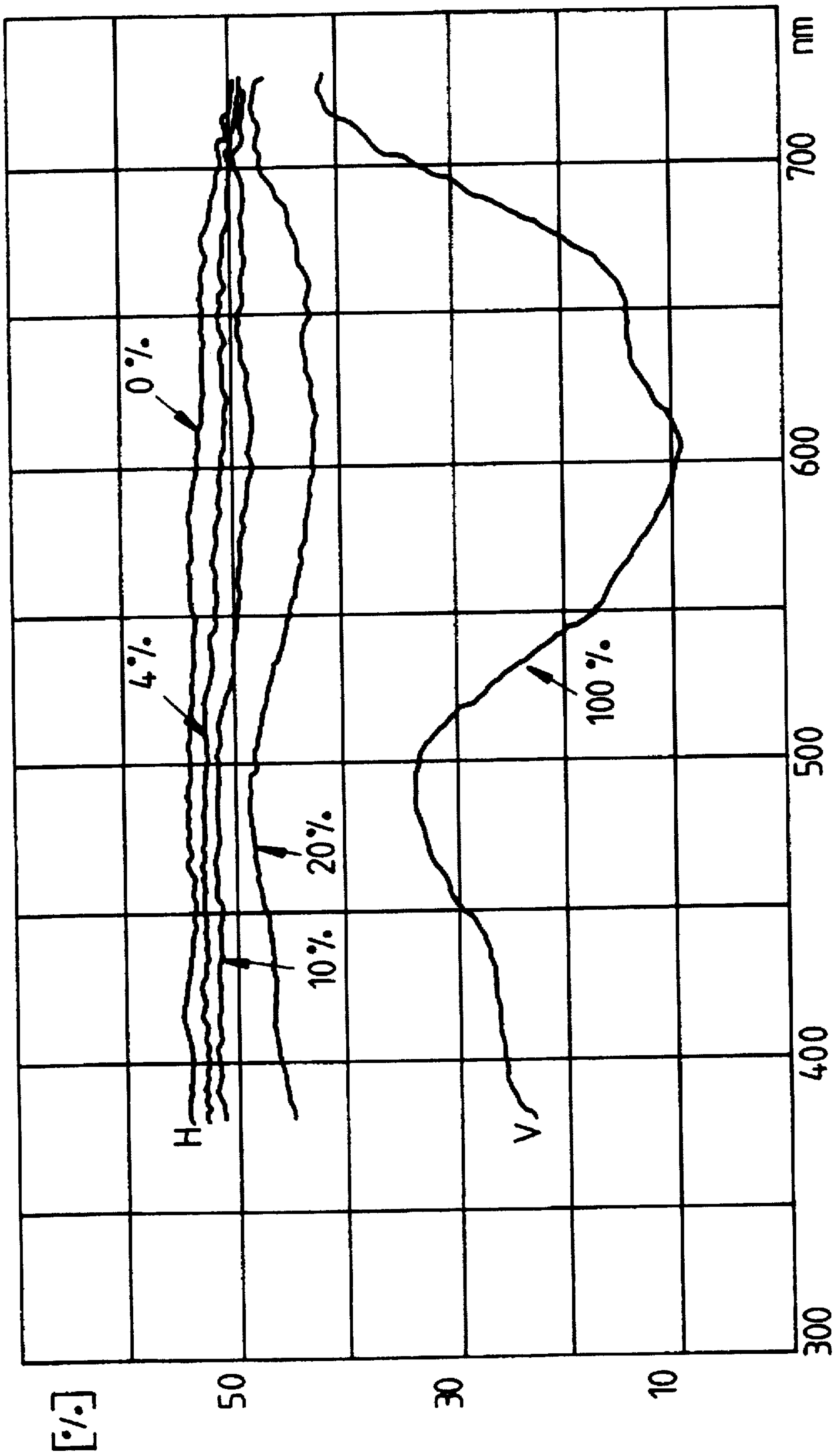
FIG. 11 is a plot diagram of diffuse reflections of different area coverages of a printing plate of an offset printing press as a function of the area coverage.

FIG. 11 shows the spectral diffuse reflection of a full-tone area V as well as of a zero-percent area H. It is clearly apparent that a spectral curve exists which is based upon the colored (blue) full-tone area. Conversely, the non-printing zero-percent area H (0%) (dark-gray) has a virtually uniform spectrum. Additionally, diffuse reflections for area coverage of 4, 10 and 20% are plotted. The greater the area coverage, the more pronounced is the assumed course of the curve of the full-tone area V (100%).

In accordance with another further development of the invention, it is also possible, instead of using filters, to measure the diffuse reflection spectroscopically, for example, by using a spectrophotometer, which separates the visible range of light, for example, into 32 intervals of 10 nm each.

With a computer connected downline, it is then possible to group together adjacent wavelength intervals to form an optimum two-filter combination or, alternatively, a three-filter combination.

The foregoing is a description corresponding in substance to German Application P 41 09 744.0, dated Mar. 25, 1991, the International priority of which is being claimed for the instant application, and which is hereby made part of this application. Any material discrepancies between the foregoing specification and the aforementioned corresponding German application are to be resolved in favor of the latter.

We claim:

1. Method for setting ink settings of a printing machine for area coverage for a printing original having printing areas and non-printing areas thereon, the printing areas being of different color than that of the non-printing areas, the printing original having a location-dependent inhomogeneity $\gamma$ independent of the area coverage, at least one full-tone area and at least one non-printing area, the method comprising the steps of: scanning with an optical scanner the original for determining a local diffuse-reflection value of at least a first and second measuring field, the measuring result of the scanning being influenced by the inhomogeneity; determining from the scanning by means of at least two sensors in the optical scanner at least two respective diffuse-reflection values from each of the measuring fields, wherein said diffuse-reflection values differ spectrally from each other in accordance with their respective color difference; determining with the optical scanner from the full-tone area at least two diffuse-reflection values (V1, V2); determining with the optical scanner from the non-printing area at least two diffuse-reflection values (H1, H2); determining with the optical scanner from each of the measuring fields at least two measuring fields having least diffuse-reflection values (S1, S2); computing with a computing device the ink settings from the diffuse-reflection values by means of a set of equations and setting the ink settings according to the computed ink settings.

2. Method according to claim 1, including forming said set of equations as:

$$S1=f_D V1+(1-f_D)(1-\gamma)H1$$

$$S2=f_D V2+(1-f_D)(1-\gamma)H2,$$

wherein S1, S2 are the measured results of corresponding diffuse-reflection values; V1, V2 are corresponding full-tone area values; $f_D$ is the area coverage; $\gamma$ is the inhomogeneity; and H1, H2 are corresponding non-printing area diffuse-reflection values.

3. Method according to claim 1, including determining a third spectrally different diffuse-reflection value from each measuring field, wherein a positional change causes a different diffuse-reflection value.

4. Method according to claim 3, including forming the equation for said system of equations as:

$$S1=f_D(1-\gamma)V1+(1-f_D)(1-\delta)H1,$$

$$S2=f_D(1-\gamma)V2+(1-f_D)(1-\delta)H2,$$

$$S3=f_D(1-\gamma)V3+(1-f_D)(1-\delta)H3,$$

wherein S1, S2, S3 are the respective diffuse-reflection values measured from the respective measuring fields; $f_D$ is the area coverage; $\gamma$ is the inhomogeneity of the non-printing area; $\delta$ is the inhomogeneity of the full-tone area; H1, H2, H3 are the respective non-printing diffuse reflection values.

5. Method according to claim 1, including arranging the area coverage on the printing original in area coverage zones, and determining the ink settings on the basis of zone-arranged area coverage values.

6. Method according to claim 1, wherein said original has globally high area coverage values, including determining the area coverage with a single optical filter in two spectrally independent steps.

7. Method according to claim 1, including determining with the optical scanner further measuring fields adjacent to said first and second measuring field, and smoothing with a computing device the inhomogeneity values by means of measurements from said further measuring fields.

8. Method according to claim 1, including forming pseudo-non-printing local diffuse-reflection values, determining smoothed inhomogeneity values by evaluation of adjacent measured measuring fields, and averaging the inhomogeneity values from the adjacent measured measuring fields.

* * * * *